United States Patent Office 3,737,413
Patented June 5, 1973

3,737,413
THERMOPLASTIC AROMATIC POLYUREAS
Heinrich Krimm, Krefeld-Bockum, Gunther Lenz, Krefeld, and Hermann Schnell, Krefeld-Uerdingen, Germany, assignors to Bayer Aktiengesellschaft, Leverkusen, Germany
No Drawing. Filed Nov. 24, 1971, Ser. No. 201,977
Claims priority, application Germany, Nov. 27, 1970, P 20 58 503.9
Int. Cl. C08g 22/02
U.S. Cl. 260—77.5 C    2 Claims

ABSTRACT OF THE DISCLOSURE

The invention relates to new high molecular linear thermoplastic aromatic N-alkyl-substituted polyureas, and to a process for their manufacture by polycondensation.

---

The invention relates to new high molecular linear thermoplastic aromatic N-alkyl-substituted polyureas, and to a process for their manufacture by polycondensation.

It is known to manufacture aromatic polyureas by polyaddition of aromatic diamines to diisocyanates. Such polyureas are however, of no industrial importance as thermoplastically processable plastics, since the NH—CO—NH group bonded to aromatic radicals is of low heat stability and the polyureas are already decomposed back to the starting substances at 150 to 200° C. The use in other fields, for example as binders for lacquers, is also limited because of the solubility in customary solvents being restricted through hydrogen bridge bonds.

Further, thermoplastic N-phenyl-substituted aromatic polyureas have already been described which are manufactured by polycondensation of aromatic N,N'-diphenyl-diamines with their bis-carbamic acid bromides in high-boiling solvents. This process has however been unable to attain industrial importance since the bis-carbamic acid bromides required as starting substances—bis-carbamic acid chlorides are evidently not usable for the process—must first be manufactured expensively from the corresponding bis-carbamic acid chlorides and phosphorus tribromide.

The subject of the invention is now high molecular, thermoplastic, linear polyureas of the formula

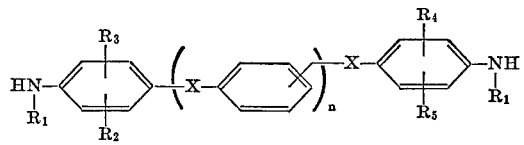

wherein $R_1$ and $R_1'$ denote a $C_1$-$C_3$-alkyl or isoalkyl radical,
$R_2$, $R_3$, $R_4$, $R_5$, $R_2'$, $R_3'$, $R_4'$ and $R_5'$ denote hydrogen, a $C_1$ to $C_3$-alkyl radical, chlorine or bromine,
X denotes a simple bond, a $C_1$ to $C_5$-alkylidene or isoalkylidene radical or a $C_5$ to $C_{12}$-cycloalkylidene radical, —$SO_2$—, —CO—, —O— or —S—,
$n$ and $n'$ denote the numbers 0 and 1 and
$z$ is a number greater than 10, preferably 20 to 500.

The polyureas of the invention possess a pattern of properties which makes them valuable thermoplastically processable plastics. They are unusually heat-resistant up to about 400° C. The heat distortion point, which is as high as about 140–160° C., ensures the constancy of important use properties, such as mechanical strength data and electrical characteristics, such as the dielectric constant and the dielectric loss factor, when exposed to heat over a wide range.

Amongst the mechanical strength properties the hardness as well as the stiffness or high molulus of elasticity should be singled out in addition to the flexural strength. The resistance to hydrolysing reagents, such as caustic alkali solutions, ammonia and mineral acids, is unusually good as compared to other polycondensation plastics. The good adhesion to carrier materials, such as metals, glass, timber and stone, can be utilised advantageously for employing the polyureas as adhesives, lacquer binders or adhesion promoters for other plastics of less good adhesion, as is of importance, for example, when incorporating reinforcing elements, such as glass fibres.

As a result of their good solubility in a series of customary solvents, such as toluene, benzene, methylene chloride, chloroform, 1,2-dichloroethane, 1,2-dichloropropane, chlorobenzene, dioxane, tetrahydrofurane, cyclohexanone and dimethylformamide, films and coatings can easily be produced on a suitable carrier material. In this way, for example, inadequate properties of other plastics, such as surface hardness and scratch resistance, can be improved. The good heat resistance of the polyureas permits thermoplastic processing in an extruder and injection moulding machine to give any desired shaped articles. Thus, for example, highly oriented filaments with good textile properties can be manufactured by the melt spinning process with subsequent stretching. Depending on their structure, the polyureas have little tendency, or a very pronounced tendency, to crystallisation. However, non-crystallising types can also be oriented by stretching and thereby gain considerably in strength and toughness.

The process according to the invention for the manufacture of high molecular, thermoplastic, linear polyureas is characterised in that aromatic di-secondary diamines of the formula

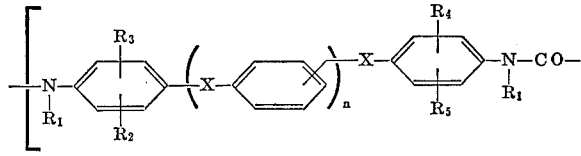

wherein
the substituents and indices have the same meaning as above,

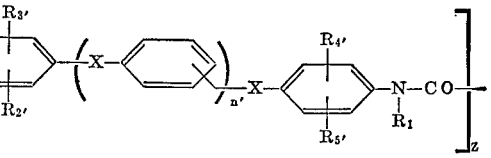

are reacted with their bis-carbamic acid chlorides at temperatures above 40° C. in the presence of acid-binding agents. The reaction is preferably carried out in homogeneous solution at temperatures between 40° C. and 120° C.

That the use of the easily accessible bis-carbamic acid chlorides instead of the bis-carbamic acid bromides according to the state of the art, leads to high molecular polycondensates was not foreseeable, particularly since the carbamic acid chlorides of aromatic secondary amines are unusually unreactive—for example, they are not hydrolysed on exposure to moist air and can be recrystallised from methanol, and thus barely show properties of an acid chloride. As aromatic di-secondary diamines the following can, for example, be used:

4,4'-di-methylamino-diphenyl,
4,4'-di-methylamino-diphenyl-ether,
4,4'-di-methylamino-diphenylsulphide,
4,4'di-methylamino-diphenylsulphone, but preferably di-alkylamino-diphenyl-alkanes, such as
4,4'-di-methylamino-diphenylmethane,
2,2-bis-(4-methylaminophenyl)-propane,
2,2-bis-(4-ethylaminophenyl)-propane,
2,2-bis-(4-methylaminophenyl)-butane,
2,2-bis-(4-methylaminophenyl)-pentane,
1,1-bis-(4-methylaminophenyl)-cyclohexane,
a,a'-di-(4-methylaminophenyl)-p-diisopropylbenzene,
a,a'-di-(4-methylamino-3-methyl-phenyl)-p-diisopropylbenzene,
a,a'-di-(4-methylaminophenyl)-m-diisopropylbenzene,
a,a'-di-(4-ethylaminophenyl)-p-diisopropylbenzene,
a,a'-di-(4-ethylamino-3-methyl-phenyl)-p-diisopropylbenzene and
a,a'-di-(4-methylamino-3-chlorophenyl)-p-diisopropylbenzene.

These compounds can be manufactured from the corresponding primary amines by known methods, such as, for example, by reducing alkylation. The bis-carbamic acid chlorides are manufactured in a manner which is in itself known by reaction of the diamines mentioned with excess phosgene in the presence of agents which bind hydrogen chloride, in homogeneous solution, using tertiary amines, such as triethylamine, N,N-dimethylaniline, N,N-dimethylcyclohexylamine, pyridine or quinoline as agents which bind hydrogen chloride, or in an aqueous disperse phase, using alkali metal hydroxide, carbonates or bicarbonates, or alkaline earth metal hydroxides, carbonates or bicarbonates as agents which bind hydrogen chloride, or by hot phosgenation of the di-secondary diamines.

One embodiment of the process of the invention consists of reacting the bis-carbamic acid chloride with the equimolar amount of the diamine in homogeneous solution with at least the amount of the tertiary amine required to bind the hydrogen chloride to be split off, at the reaction temperature. A further preferred embodiment consists of reacting the bis-carbamic acid chloride with the equimolar amount of the diamine in the presence of an amount of an aqueous solution or suspension of an alkali metal hydroxide, carbonate or bicarbonate or alkaline earth metal hydroxide, carbonate or bicarbonate which suffices to bind the hydrogen chloride, at the reaction temperature.

In both process variants the reaction temperature is about 40 to 120° C., preferably about 50 to 100° C. Inert solvents, such as benzene, toluene, xylene, chlorobenzene, 1,2-dichloroethane, 1,2-dichloropropane, chloroform, trichloroethylene, 1,4-dioxane and tetrahydrofurane can be used conjointly.

Tertiary amines, such as triethylamine, trimethylamine, tributylamine, 1,4-diaza-(2,2,2)-bicyclooctane, dimethylcyclohexylamine, and dimethylbenzylamine, as well as quaternary ammonium salts, such as triethylbenzylammonium chloride can be used in catalytic amounts as accelerators. Emulsifiers and surface-active agents, such as sodium isopropylnaphthalenesulphonate can be added. The addition of chain stoppers, such as dimethylamine methylcyclohexylamine, methylaniline, dicyclohexylamine or piperidine, is suitable for restricting the molecular weights. Both process variants can also be carried out in such a way that the bis-carbamic acid chloride obtained in the above-mentioned manner by reaction of the diamine with phosgene is not in itself isolated but is finally condensed with more diamine to give the polyurea.

The physical properties of the polyureas can be improved in a manner which is in itself customary by means of reinforcing elements, such as glass fibres (increasing the strength and toughness of shaped articles made of polyureas). Furthermore, dyestuffs and fillers, such as pigments, carbon black, quartz powder and glass powder, and asbestos, can be incorporated.

EXAMPLE 1

750 ml. of 4 N sodium hydroxide solution are added to a solution of 254 g. (1 mol) of 2,2-bis-(4-methylamino-phenyl)-propane and 3 ml. of triethylamine in 600 ml. of chlorobenzene, and thereafter a solution of 379 g. (1 mol) of bis-carbamic acid chloride of 2,2-bis-(4-methylaminophenyl)-propane (melting point 106° C., boiling point 215 to 220° C./0.07 mm. Hg) in 400 ml. of chlorobenzene is added dropwise over the course of one hour, under a nitrogen atmosphere, at 80° C. The temperature is maintained for 40 hours and on cooling a viscous paste is obtained, which is diluted with methylene chloride and after separating off the aqueous phase is neutralised with phosphoric acid and repeatedly extracted by shaking with water. The solution is dried over sodium sulphate and clarified by filtration under pressure. The clear solution is then evaporated under reduced pressure and the residue is reprecipitated with methanol. The polycondensate which has not dissolved in the methanol is brought to 280° C. under reduced pressure in an apparatus equipped with a metal stirrer, until all volatile substances have been removed and a pressure of 0.1 mm. Hg has finally been reached. A tough, yellowish product is obtained which can be drawn into elastic filaments or ribbons at about 170 to 200° C. The density is 1.127 at 20° C. and the relative viscosity in methylene chloride (c.=0.005 g./ml. at 25° C.) is 1.574.

According to DTA measurements (differential thermal analysis) the polyurea is stable up to 390° C. The glass temperature is about 140° C. The polyurea dissolves in solvents such as toluene, benzene, methylene chloride, chloroform, 1,2 - dichloroethane, 1,2 - dichloropropane, chlorobenzene, dioxane, tetrahydrofurane, cyclohexanone and dimethylformamide. It does not crystallise, or only crystallises with great difficulty.

EXAMPLE 2

A solution of 37.9 g. (0.1 mol) of bis-carbamic acid chloride of 2,2-bis-(p-methylaminophenyl)-propane in 50 ml. of toluene is added dropwise, at 50° C., to a solution of 25.4 g. (0.1 mol) of 2,2-bis-(p-methylaminophenyl)-propane in 100 ml. of quinoline, in a nitrogen atmosphere. The mixture is then warmed to 60° C. for 5 hours and to 85° C. for 20 hours. The reaction mixture, which is now viscous, is diluted with methylene chloride and the quinoline is extracted by repeated shaking with dilute hydrochloric acid until quinoline is no longer detectable in the aqueous solution by rendering it alkaline. The solution is dried with sodium sulphate, filtered and concentrated. The residue is boiled three times with 1 litre of methanol and cooled to room temperature, and the solvent is decanted. The resin is dissolved in methylene chloride and films are cast from the solution on a glass plate. After complete drying, these films are treated with warm water until they detach from the glass plate. The relative viscosity (measured as in Example 1) of a sample which has been dried for 50 hours at 150° C. under reduced pressure is 1.352.

EXAMPLE 3

A solution of 37.2 g. (0.1 mol) of a,a'-di-(p-methylaminophenyl)-p-diisopropylbenzene and 37.9 g. (0.1 mol) of bis-carbamic acid chloride of 2,2-bis-(p-methylaminophenyl)-propane in 100 ml. of dichloropropane is warmed to 60° C., 75 ml. of 4 N sodium hydroxide solution, 0.4 ml. of triethylamine and 0.6 g. of sodium isopropylnaphthalenesulphonate are added, and the reaction mixture is heated to the reflux temperature for 15 hours whilst stirring in a nitrogen atmosphere. The viscous paste is allowed to cool and dissolved in methylene chloride, and the solution is washed with water, rendered acid with dilute acetic acid and washed with water until neutral. The solution is dried over sodium sulphate and evaporated under reduced pressure on a waterbath. The residue is twice reprecipitated from methanol. The resin which is insoluble in methanol is freed of volatile constituents under reduced pressure, finally at 300° C./0.1 mm. Hg. Elastic filaments can be drawn from the viscous, yellowish melt thus obtained. The relative viscosity (measured as in Example 1) in methylene chloride is 1.231.

What is claimed is:

1. A high molecular thermoplastic, linear polyurea consisting essentially of a plurality of repeating units of the formula

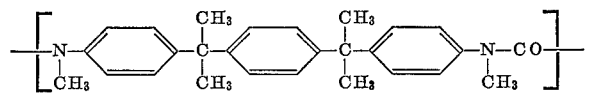

2. A high molecular weight thermoplastic, linear polyurea consisting essentially of a plurality of repeating units of the formula

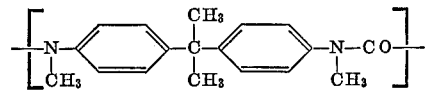

References Cited

UNITED STATES PATENTS

| | | | |
|---|---|---|---|
| 3,164,571 | 1/1965 | Cotter | 260—77.5 |
| 2,816,879 | 12/1957 | Wittbecker | 260—77.5 |
| 3,528,949 | 9/1970 | Rutledge | 260—77.5 |
| 3,666,728 | 5/1972 | Bonner | 260—77.5 |

DONALD E. CZAJA, Primary Examiner

H. S. COCKERAM, Assistant Examiner

U.S. Cl. X.R.

260—30.4 32.6, 32.8, 33.6, 33.8, 37 N, 77.5 AC